United States Patent [19]

Winchell

[11] 4,054,300
[45] Oct. 18, 1977

[54] CAMBERING VEHICLE WITH TRAILING ARMS INTERCONNECTED BY GEARED STABILIZER AND EQUALIZER MECHANISM

[75] Inventor: Frank J. Winchell, Orchard Lake, Mich.

[73] Assignee: General Motors Corporation, Detroit, Mich.

[21] Appl. No.: 727,586

[22] Filed: Sept. 28, 1976

[51] Int. Cl.² .................. B60G 19/00; B62K 15/00
[52] U.S. Cl. ..................... 280/278; 280/112 A; 280/221; 280/293
[58] Field of Search ........... 280/87 R, 87 B, 112 R, 280/112 A, 278, 287, 6 R, 6 H, 6.1, 6.11, 200, 210, 218, 220, 221, 224, 21 R, 21 A, 12.1, 12 H, 282, 296; 180/25 R, 26 R, 25 A, 41

[56] References Cited

U.S. PATENT DOCUMENTS

| 487,753 | 12/1892 | Koenig | 180/26 |
|---|---|---|---|
| 1,450,197 | 4/1923 | Zwickey | 280/293 X |
| 1,716,233 | 6/1929 | Marsh | 280/6.11 |
| 2,593,974 | 4/1952 | Brown | 280/21 R |
| 2,696,387 | 12/1954 | Nordin | 280/96.2 |
| 2,887,322 | 5/1959 | De Monge | 280/112 A |
| 3,277,840 | 10/1966 | Li | 105/145 |
| 3,964,563 | 6/1976 | Allen | 180/41 |

FOREIGN PATENT DOCUMENTS

| 4,942,586 | 11/1974 | Japan | 280/87 R |

Primary Examiner—Joseph F. Peters, Jr.
Assistant Examiner—Jack D. Rubenstein
Attorney, Agent, or Firm—Charles R. White

[57] ABSTRACT

A cambering vehicle having a pair of trailing arms pivoted to the front steering frame for up and down swinging movement on either side of the steering frame and interconnected by differential gearing that stabilizes and holds the steering frame at a predetermined rake angle while permitting equal and opposite movement of the trailing arms. This gearing can be locked to lock the trailing arms and steering frame together for vehicle parking purposes. An adjustment is provided to permit the rake angle of the steering frame to be changed and to further permit the steering frame to be collapsed toward the trailing arms and locked to provide a low profile position for transportation or storage purposes.

4 Claims, 8 Drawing Figures

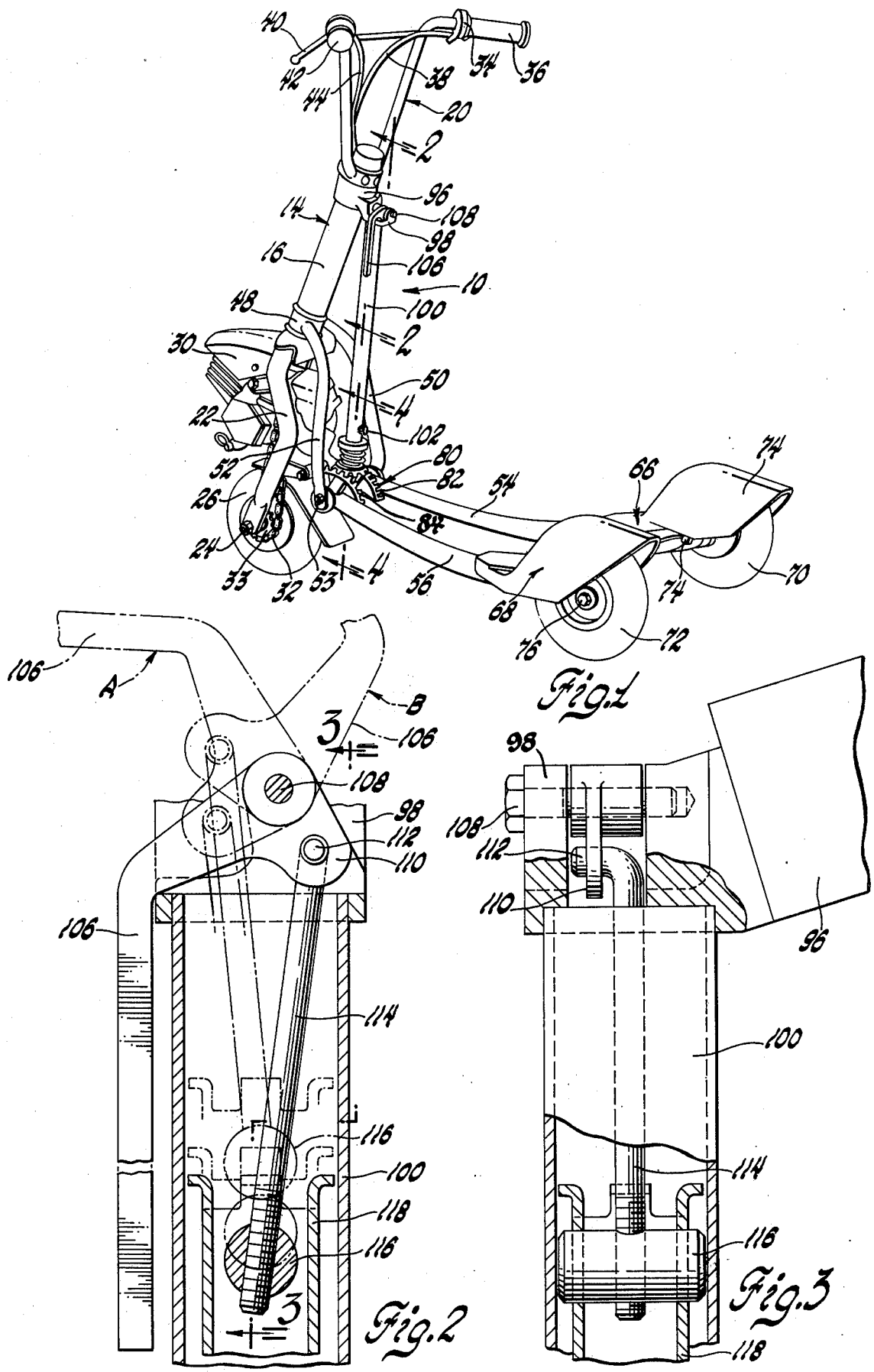

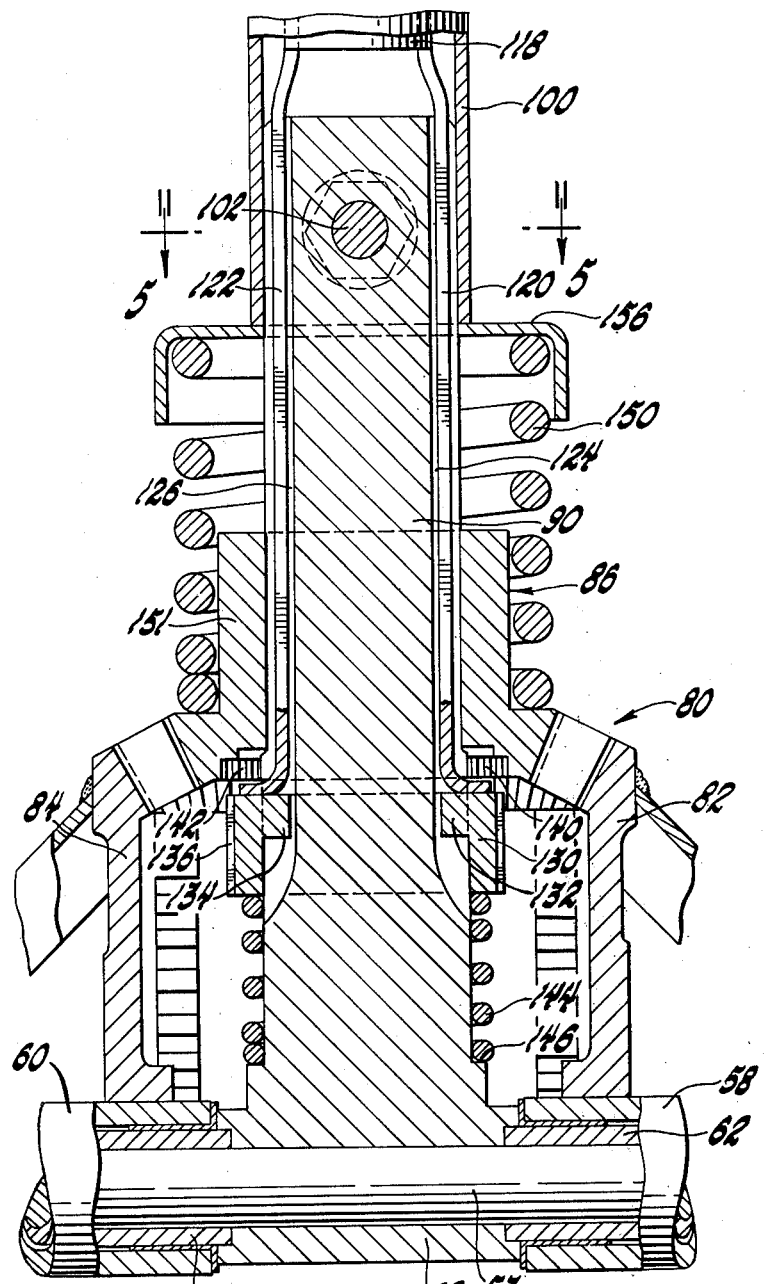
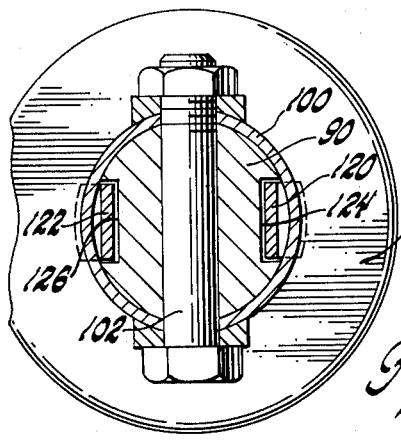
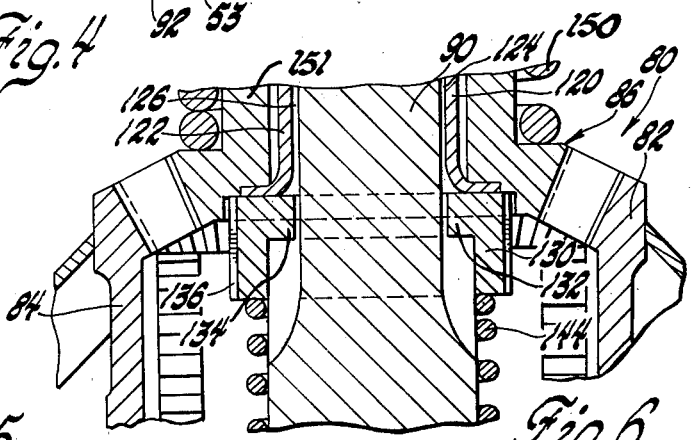

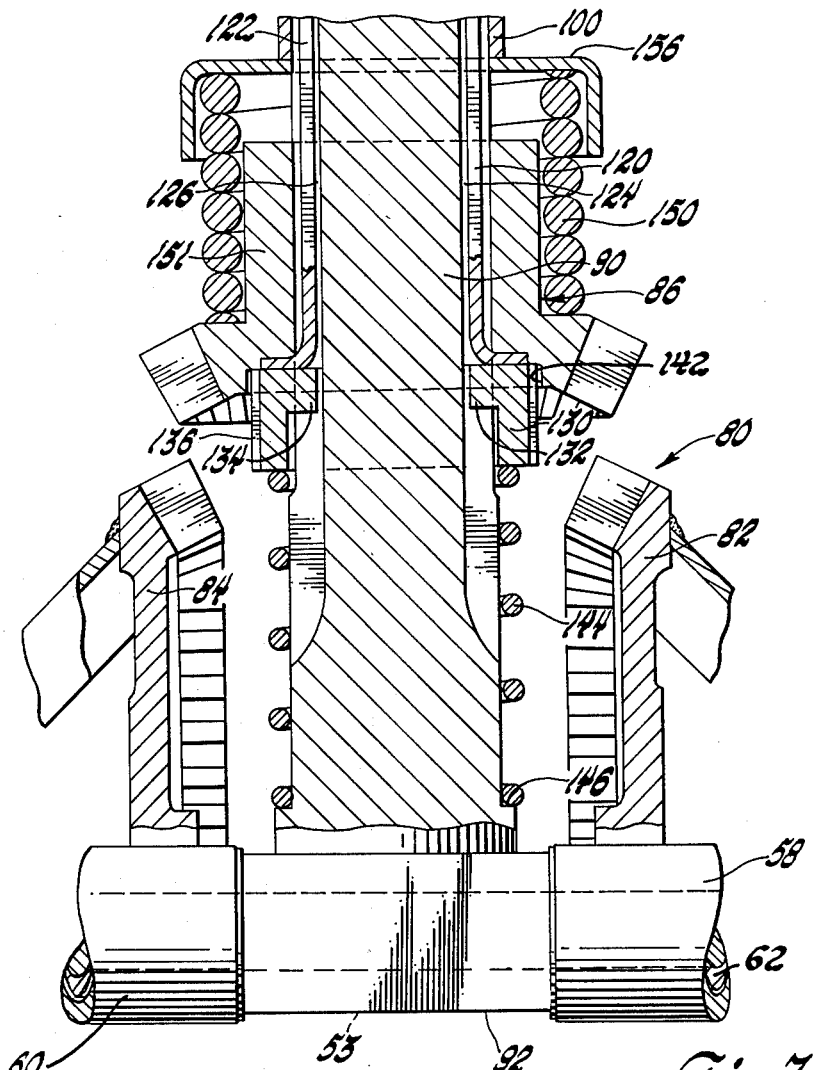
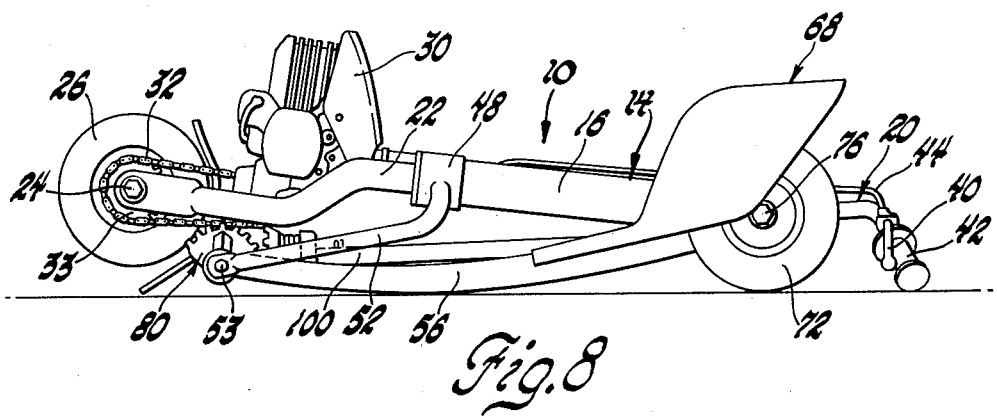

CAMBERING VEHICLE WITH TRAILING ARMS INTERCONNECTED BY GEARED STABILIZER AND EQUALIZER MECHANISM

This invention relates to vehicles and more particularly to a new and improved light weight cambering vehicle having a geared stabilizer and equalizer mechanism interconnecting a pair of trailing arms with a main steering column for improved rake angle adjustment, vehicle operation, vehicle parking and stowage.

In the preferred embodiment of this invention there is a new and improved differential gear arrangement drivingly interconnecting the pivoted trailing arms of a three place contact cambering vehicle which has an upstanding front steering column. The differential gearing incorporates a pair of side gears carried by the trailing arms which are interconnected by a pinion gear so that swinging movement of one of the arms in one direction will cause the equal and opposite swinging movement of the other of the arms. While providing for the equal and opposite swinging movement of the trailing arms, the gearing mechanism importantly provides a mechanism to fix and stabilize the angle of the steering column with respect to the support surface. To this end, there is a centralized stabilizer tube connected at an upper end portion to the steering column and at its lower end portion to a pivot shaft that pivotally connects the two trailing arms to the front frame. The pinion gear movably supported on the stabilizer tube can be selectively disengaged by a linkage system from the driving engagement with the side gears so that the rake angle of the front steering column can be changed and maintained in an adjusted position by the re-engagement of the pinion gear at a different arcuate position with respect to the side gears. This provides a wide range of rake angle adjustments. In addition the invention has means for preventing rotation of the pinion gear so that the side gears cannot be turned and the trailing arms are held in relative angular position to provide for improved vehicle parking. If desired, the vehicle can be parked on an incline with the trailing arms locked at an appropriate relative angular position. The invention provides for an improved stowage of the vehicle since the front steering column can be moved to a folded position adjacent to the trailing arms and locked in a low profile position. The vehicle of this invention is a light weight, narrow track cambering vehicle of articulated frame members which can be adjusted to provide improved vehicle operation and operator comfort. These and other objects, advantages and features of the invention will become more apparent from the following detailed description and drawings in which:

FIG. 1 is a perspective view of a preferred embodiment of the cambering vehicle of this invention.

FIG. 2 is a sectional view taken along line 2—2 of FIG. 1.

FIG. 3 is a sectional view taken along line 3—3 of FIG. 2.

FIG. 4 is a sectional view taken along line 4—4 of FIG. 1.

FIG. 5 is a cross sectional view taken along line 5—5 of FIG. 4.

FIG. 6 is a sectional view similar to FIG. 4 showing some of the elements of FIG. 4 moved to an adjusted position.

FIG. 7 is a sectional view similar to FIG. 4 illustrating some of the elements of FIG. 4 moved to another adjusted position.

FIG. 8 is a side elevational view of the vehicle of FIG. 1 collapsed into a compact position.

Turning now in greater detail to the drawings the cambering vehicle 10 shown in FIG. 1 comprises a front steering frame 14 which includes a tubular column 16 that rotatably supports an elongated steering shaft that is coaxial with and extends through the column. The upper end of the steering shaft is provided with a handle bar assembly 20 while the lower end carried a fork 22 that supports front axle 24 and the rotatable front wheel 26. The front fork further supports an internal combustion engine 30 which drives the front wheel 26 through a drive chain 32 and sprocket 33. Engine operation is controlled by manually operated controls mounted on the handle bar assembly 20. Engine speed is adjusted by rotatable throttle control 34 adjacent to the inboard end of the right hand handle bar grip 36. This throttle control is operatively connected to the engine throttle by cable means 38 and is manually adjusted by the vehicle operator to set the engine at selected throttle openings from idle to wide open throttle. Lever 40, mounted on the handle bar assembly adjacent to the left hand handle bar grip 42, is operatively connected to the engine by cable 44 and is actuatable by the operator to override a one way clutch for vehicle starting purposes.

Extending rearwardly and downwardly from a circular collar 48, surrounding and secured to a lower portion of the front column 16 above the fork 22, are right and left connector bars 50, 52 the ends of which support a transversely extending cylindrical pivot shaft 53. Right and left trailing arms 54, 56 are mounted for up and down swinging movement on pivot shaft 53 and as best shown in FIGS. 4 and 7 the forward ends of these arms have hubs 58 and 60 with bearing sleeves 62 and 64 through which pivot shaft 53 extends. The trailing arms extend rearwardly from the front frame and have right and left combination foot pads and wheel fenders 66 and 68 which are mounted on suitable pivots and support brackets for operator initiated fore and aft rocking movement. When the operator stands and rocks the foot pads forwardly, his body weight is naturally displaced forwardly so that the front drive wheel 26 is impressed with an increased load for improved drive wheel traction. By physically rocking rearwardly on the foot pads, friction pad means internally of the wheel covers frictionally engage the right and left rear wheels 70, 72 for vehicle braking purposes. These rear wheels are rotatably mounted on axles 74, 76 in turn, supported by suitable bracket means (not illustrated) that are fixed to the right and left trailing arms 54, 56.

This invention provides an improved stabilizer and equalizer construction especially provided to maintain the steering column 16 at a predetermined rake angle with respect to the supporting surface and to provide for the equal and opposite movement of the trailing arms when the operator cambers the vehicle during operation. Such construction is provided by a differential type gear unit 80 having side bevel gear segments or side gears 82 and 84 secured to the hubs 58 and 60 of the right and left trailing arms 54 and 56 in a side by side arrangement. The side gears are drivingly interconnected by a rotatable pinion gear 86 whose teeth mesh with the side gear teeth as illustrated in FIGS. 1 and 4. The pinion gear 86 is rotatably mounted on a centralized shaft 90 which extends upwardly from a journal box 92 axially aligned with hubs 60 and 62, through through which shaft 53 extends. In normal cambering operation of the vehicle the swinging movement of one of the arms in a first direction will, acting through the meshing gearing, cause the other trailing arm to move in an equal and opposite direction. Additionally, the gear unit 80 provides for the stabilization of the front frame at a predetermined rake angle with respect to the vehicle support surface. As shown in FIG. 1 an upper collar 96 surrounds and is fixed to column 16 immediately below the handle bar assembly 20. This collar has an integral ledge like extension 98 projecting rearwardly from the collar 96. Welded or otherwise secured to the extension 98 is a stabilizer tube 100 which extends downwardly from the extension 98 onto the upper portion of the central connector shaft 90. Bolt means 102 diametrically extending through the stabilizer tube 100 and the shaft 90 secures these components together. With the angular position of the stabilizer tube determined by arcuate position of the pinion gear 86 meshing with the side gears, the rake angle of the steering column 16 is determined.

With this invention the rake angle of the column 16 can be readily adjusted and secured by the operator at various angular positions with respect to the support surface for improved comfort of operation and to make the vehicle better suited for operators of different physiques. Furthermore, the column can be moved to a collapsed position adjusted to the trailing arms as shown in FIG. 8 for vehicle stowage or transportation purposes. To provide for these important functions, the pinion gear 86 is mounted for axial sliding movement on the connector shaft 90 between the position of FIG. 4 in which the pinion gear meshingly engages the side gears 82 and 84 and the position shown in FIG. 7 in which the pinion gear is moved out of mesh with the side gears.

As shown in FIGS. 1 and 2, a manual lever 106 is mounted on pivot pin 108 supported on extension 98 for movement between the full line position alongside of the central stabilizer tube, in which the gears are drivingly engaged; the dashed line position A, in which the gears are engaged but are locked together; and the dashed line position B, in which the pinion gear is disengaged from the side gear. This lever has an offset lever arm 110 to which the end 112 of an elongated connector rod 114 is pivotally connected. Connector rod 114 extends into the stabilizer tube 100 and is threadedly connected with a transversely extending pivot shaft 116. The pivot shaft 116 extends diametrically through a tubular connector 118 that is mounted for axial sliding movement in the stabilizer tube 100. As shown in FIG. 4 a pair of diametrically opposed straps 120 and 122 are secured to the lower end of tubular connector 118 and extend in a pair of longitudinal grooves 124 and 126 cut into the outer surface of the connector shaft 90. The lower end of these straps extend through the pinion gear 86 and have terminal ends which are fastened to a cylindrical pinion release and locking member 130 which is internally keyed at 132 and 134 to the connector shaft 90. These keys permit the pinion release and locking member to be axialy moved to various positions on the connector shaft while preventing relative rotation of these components.

The pinion release and locking member 130 has external splines 136 that can be brought into meshing engagement with the internal splines 140 formed in a cylindrical recess 142 provided in the lower end of pinion gear 86 to lock these components together and thus prevent rotation of the side gears and trailing arms. A helical spring 144 seated on shoulder 146 and disposed around the lower portion of central shaft 90 engages the lower end of the pinion release and locking member 130 to provide a spring force urging this member into locking engagement with pinion gear 86. Another helical spring 150, disposed around the cylindrical hub 151 of the pinion gear 86, has one end seated on a bearing surface on the upper side thereof and the other end seated in an annular cap 156 that is secured to the lower end of the stabilizer tube 100. This spring provides the spring force to urge the pinion gear into meshing engagement with the side gears.

With the lever 106 in the full line position shown in FIG. 2 the vehicle is conditioned for normal cambering operations. The vehicle operator can stand on the foot pads and manually grip the handle bars and operate the vehicle in an upright or cambering mode of operation while traversing a course. The spring 144 cannot cause the pinion gear to move from meshing engagement with the side gears since the lever 106 is in the stop position alongside of the control shaft 100.

Assuming that the operator desires to park the vehicle on a level or an inclined slope he will, after stopping the vehicle, move the lever 106 to position A shown in FIG. 2. This lever movement actuates the threaded connector 114 causing it to move it to the dotted line position shown and to pull upwardly on the tube 188, the straps 124 and 126 and the pinion release and locking member 130. The member 130 is thus moved into meshing engagement with the internal splines of the pinion gear as shown in FIG. 6. Since the member 130 is internally keyed to the connector shaft 90, it cannot turn and thus the pinion gear is immobilized so that the side gears cannot turn. Under these conditions the trailing arms are locked so that they cannot swing in either direction. It should be noted, however, that the trailing arms can be set at various angular relationships to each other to provide for hillside parking.

In the event that the operator desires to pivot the steering column on pivot shaft 53 to change the rake angle, the lever 106 can be manually moved to and held at position B so that the pinion gear is moved upwardly on connector shaft 90 from the FIG. 6 position to the FIG. 7 position. In this latter position the pinion gear is free of the side gears. The rake angle can then be adjusted by manually moving the steering column to a new angular position with respect to the support surface. By releasing the lever 106, the spring 150 which was under a manual compression load will extend to effect the reengagement of the pinion gear and the side gears at the new rake angle. These gears will also be locked as shown in FIG. 6. It will be appreciated that a large number of rake angles are possible with this invention being limited by the size and spacing of the teeth of the pinion and side gears. With this large number of rake angle positions the vehicle can be readily adjusted to suit a variety of operators having widely varying physiques.

In addition to rake angle adjustment the movement of the pinion gear to the release of FIG. 7 position allows the column to be moved to the folding position adjacent to the trailing arms as shown in FIG. 8. After the folded position has been reached the lever 106 is released from the grip of the operator and it is biased by spring 150 to the position B and the pinion gear is engaged with the side gears and locked with the central shaft 90 as shown in FIG. 8.

While a preferred embodiment of this invention has been shown and described to illustrate operating principles thereof, other embodiments will become apparent to those skilled in the art. Accordingly, the scope of this invention is set forth in the following claims.

What is claimed is:

1. A cambering vehicle for movement along a support surface comprising a steering frame secured at a first selected rake angle with respect to the support surface, a pair of laterally spaced and elongated trailing arms extending from said frame, pivot means pivotally connecting a forward end portion of each of said arms to said frame thereby supporting said arms for swinging movement on said pivot means, contact means adjacent to the free end portions of each of said trailing arms for engaging the support surface, steerable front contact means operatively supported on said frame for engaging the supporting surface, manual steering means operatively connected to said front steerable contact means, foot support means on each of said trailing arms for receiving the feet of an operator so that the operator can stand on the vehicle and manually grip said manual steering means, gear unit means interconnecting said trailing arms so that they swing in equal and opposite directions as said operator cambers said vehicle, said gear unit means incorporating first gear means secured to one of said arms and a second gear means secured to the other of said arms and additional gear means operatively connected to said steering frame and intermeshing with said first and second gear means to thereby provide a geared drive connection between said trailing arms so that they swing in equal and opposite directions, manual means operatively connected to said additional gear means for disengaging said additional gear means from meshing engagement with said first and second gear means to release the drive connection between said arms so that said frame can be pivoted toward said trailing arms and subsequently positioned at a selected angle with respect to said first selected rake angle.

2. A cambering vehicle for movement along a support surface comprising a steering frame secured at a first selected rake angle with respect to the support surface, a pair of laterally spaced and elongated trailing arms extending along said support surface from said frame, pivot means pivotally connecting a forward end portion of each of said arms to said frame thereby supporting said arms for up and down swinging movement, contact means adjacent to the free end portions of each of said trailing arms for engaging the support surface, steerable front contact means operatively supported on said frame for engaging the supporting surface, steering means operatively connected to said front steerable contact means, foot pad means on each of said trailing arms and laterally spaced from each other for receiving the feet of an operator so that the operator can stand on the vehicle and manually grip said manual steering means, gear means interconnecting said trailing arms so that they swing in equal and opposite directions as said operator cambers said vehicle, said gear means incorporating a first side gear secured to one of said arms and a second side gear secured to the other of said arms and third gear means intermeshing with each of said side gear means to thereby provide a geared drive connection between said trailing arms so that they swing in equal and opposite directions, stabilizer bar means contacting said frame to said pivot means, means slidably mounting said third gear means on said bar means, manual operative linkage means operatively connected to said third gear means for displacing said third gear means on said bar means and from meshing engagement with said side gear means to release the drive connection between said arms so that said frame can be pivoted toward said trailing arms for urging said third gear means back to engagement with said side gear means to position said steering frame at another selected rake angle angularly displaced from said first rake angle.

3. A cambering vehicle for movement along a support surface comprising an upright frame, a air of laterally spaced and elongated trailing arms extending from said frame, pivot means pivotally connecting a forward end portion of each of said arms to said frame thereby supporting said arms for up and down swinging movement, contact means on the free end portions of each of said trailing arms for engaging the support surface, steerable front contact means operatively supported on said frame for engaging the supporting surface, manual steering means operatively connected to said front steerable contact means, foot pad means on the free end portions of each of said trailing arms for receiving the feet of an operator so that the operator can stand on the vehicle and manually grip said manual steering means, gear means interconnecting said trailing arms so that they swing in equal and opposite directions as said operator cambers said vehicle, said gear means incorporating a first side gear secured to one of said arms and a second side gear secured to the other of said arms and additional idler gear means intermeshing with each of said gear means to thereby provide a geared drive connection between said trailing arms so that they swing in equal and opposite directions, manual means operatively connected to said idler gear means for disengaging said additional gear means from meshing engagement with said side gear means to release the drive connection between said arms so that said frame can be pivoted toward said trailing arms and subsequently positioned at a selected angle with respect to said support surface.

4. A cambering vehicle for movement along a support surface comprising a steering column, connector bar means extending from said column, a pair of laterally spaced and elongated trailing arms extending from said connector bar means, pivot means laterally extending relative to said connector bar means for pivotally connecting a forward end portion of each of said arms to said connector bar means thereby supporting said arms for up and down swinging movement, contact means on the free end portions of each of said trailing arms for engaging the support surface, steerable front contact means operatively supported on said column for engaging the supporting surface, manual steering means operatively connected to said front steerable contact means, foot pad means on the free end portions of each of said trailing arms for receiving the feet of an operator so that the operator can stand on the vehicle and manually grip said manual steering means, gear unit means interconnecting said trailing arms so that they swing in equal and opposite directions as said operator cambers said vehicle, said gear means incorporating a first bevel gear means secured to one of said arms and a second bevel gear means secured to the other of said arms facing said first bevel gear means and pinion gear means intermeshing with said first and second bevel gear means to thereby provide a geared drive connection between said trailing arms so that they swing in equal and opposite directions, stabilizer bar means connecting said steering column to said pivot means, said stabilizer bar means having connector means mounting said pinion gear means for rotary and longitudinal movement thereon, linkage means operatively connected to said pinion gear means for longitudinally moving said pinion gear means on said support means for moving said pinion gear means from meshing engagement with said bevel gear means to release the drive connection between said arms so that said steering column can be pivoted to a folded position adjacent to said trailing arms, and means to lock said pinion gear from rotary movement with respect to said support means to thereby lock said trailing arms and said steering column together.

* * * * *

UNITED STATES PATENT OFFICE
CERTIFICATE OF CORRECTION

Patent No. 4,054,300     Dated October 18, 1977

Inventor(s) Frank J. Winchell

It is certified that error appears in the above-identified patent and that said Letters Patent are hereby corrected as shown below:

Column 3, line 1, delete "through".

Column 3, line 29, "adjusted" should read -- adjacent -- .

Column 3, line 61, "axialy" should read -- axially -- .

Column 5, line 67, "tacting" should read -- necting -- .

Column 6, line 6, after "arms" insert -- and means -- .

Column 6, line 7, "to", first occurrence, should read -- into --.

Column 6, line 11, "air" should read -- pair -- .

Signed and Sealed this

Sixteenth Day of May 1978

[SEAL]

Attest:

RUTH C. MASON
Attesting Officer

LUTRELLE F. PARKER
Acting Commissioner of Patents and Trademarks